(12) United States Patent
Choi et al.

(10) Patent No.: US 12,039,794 B2
(45) Date of Patent: Jul. 16, 2024

(54) ELECTRONIC DEVICE AND CONTROL METHOD THEREOF

(71) Applicant: SAMSUNG ELECTRONICS CO., LTD., Suwon-si (KR)

(72) Inventors: Kyoungho Choi, Suwon-si (KR); Wonsik Song, Seoul (KR); Sungwon Ahn, Seoul (KR); Jongchan Won, Suwon-si (KR); Jonghoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 474 days.

(21) Appl. No.: 17/420,964

(22) PCT Filed: Jun. 24, 2021

(86) PCT No.: PCT/KR2021/007962
§ 371 (c)(1),
(2) Date: Jul. 6, 2021

(87) PCT Pub. No.: WO2022/010140
PCT Pub. Date: Jan. 13, 2022

(65) Prior Publication Data
US 2023/0144241 A1    May 11, 2023

(30) Foreign Application Priority Data
Jul. 6, 2020   (KR) .................. 10-2020-0082807

(51) Int. Cl.
*G06V 20/68* (2022.01)
*G06F 16/538* (2019.01)
(Continued)

(52) U.S. Cl.
CPC ............ *G06V 20/68* (2022.01); *G06F 16/538* (2019.01); *G06F 16/54* (2019.01); *G06F 16/587* (2019.01); *G06V 10/82* (2022.01)

(58) Field of Classification Search
CPC ........ G06V 20/68; G06V 10/82; G06V 20/20; G06F 16/538; G06F 16/54; G06F 16/587; G06F 16/583; G06F 16/532; G06F 16/284
See application file for complete search history.

(56) References Cited

U.S. PATENT DOCUMENTS

| 8,364,545 | B2 | 1/2013 | Arsenault |
| 10,616,478 | B2 | 4/2020 | Jung et al. |

(Continued)

FOREIGN PATENT DOCUMENTS

| JP | 2012181797 A | 9/2012 |
| JP | 2018-535502 A | 11/2018 |

(Continued)

OTHER PUBLICATIONS

Search Report (PCT/ISA/210) issued Oct. 12, 2021 by the International Searching Authority for International Application No. PCT/KR2021/007962.

(Continued)

*Primary Examiner* — Siamak Harandi
(74) *Attorney, Agent, or Firm* — Sughrue Mion, PLLC

(57) ABSTRACT

A control method of an electronic device including a camera, including: based on an image of food being acquired through the camera, identifying a type of the food based on the acquired image and location information of the electronic device; identifying a type of at least one wine matched to the identified type of the food based on information about the identified type of the food from among information about a plurality of foods and information about a plurality of wines;

(Continued)

and providing information about the identified type of the at least one wine.

14 Claims, 10 Drawing Sheets

(51) Int. Cl.
*G06F 16/54* (2019.01)
*G06F 16/587* (2019.01)
*G06V 10/82* (2022.01)

(56) References Cited

U.S. PATENT DOCUMENTS

| | | | |
|---|---|---|---|
| 10,951,813 B2 | 3/2021 | Jung et al. | |
| 10,977,710 B2 | 4/2021 | Axelsson et al. | |
| 11,146,724 B2 | 10/2021 | Jung et al. | |
| 2013/0339179 A1 | 12/2013 | Pickelsimer | |
| 2014/0104385 A1* | 4/2014 | Wong | G06Q 30/016 382/110 |
| 2014/0324624 A1 | 10/2014 | Ward et al. | |
| 2014/0334691 A1 | 11/2014 | Cho et al. | |
| 2016/0035248 A1* | 2/2016 | Gibbs | G06T 7/60 434/127 |
| 2019/0174056 A1 | 6/2019 | Jung et al. | |
| 2019/0208117 A1 | 7/2019 | Jung et al. | |
| 2019/0213419 A1 | 7/2019 | Seeley et al. | |
| 2019/0340674 A1 | 11/2019 | Vaananen | |
| 2020/0042865 A1* | 2/2020 | Lee | G06N 3/047 |
| 2020/0177802 A1 | 6/2020 | Jung et al. | |
| 2020/0349630 A1* | 11/2020 | Maruoka | G06Q 30/0623 |

FOREIGN PATENT DOCUMENTS

| | | |
|---|---|---|
| JP | 201946485 A | 3/2019 |
| KR | 10-2013-0126532 A | 11/2013 |
| KR | 101563694 B1 | 10/2015 |
| KR | 10-2017-0052175 A | 5/2017 |
| KR | 10-1843987 B1 | 3/2018 |
| KR | 10-2019-0064958 A | 6/2019 |
| KR | 10-2019-0104487 A | 9/2019 |
| KR | 10-2057083 B1 | 12/2019 |
| KR | 10-2020-0001296 A | 1/2020 |
| KR | 10-2090545 B1 | 3/2020 |
| KR | 10-2087824 B1 | 4/2020 |

OTHER PUBLICATIONS

Written Opinion (PCT/ISA/237) issued Oct. 12, 2021 by the International Searching Authority for International Application No. PCT/KR2021/007962.

* cited by examiner

ELECTRONIC DEVICE AND CONTROL METHOD THEREOF

TECHNICAL FIELD

The disclosure relates to an electronic device and a control method thereof, and wore particularly, to an electronic device that provides a type of food or wine matched to each acquired image of the wine or the food based on an image of the wine or the food is acquired, and a control method thereof.

CROSS-REFERENCE TO RELATED APPLICATIONS

This application claims benefit of priority to Korean Patent Application No. 10-2020-0082807, filed on Jul. 6, 2020, in the Korean Intellectual Property Office, the disclosure of which is incorporated by reference herein in its entirety.

BACKGROUND ART

Conventionally, as a result of acquiring an image of wine using a mobile terminal, a technology for recognizing wine using the image and providing information on the recognized wine has been developed and utilized. However, in the case of the conventional technology, there has been a limitation in that a wine type recognition rate is not high, because a type of wine is not easily recognized using an image of a photographed wine.

In addition, in the case of the conventional technology, there is a problem in that it is not possible to recommend food suitable for the recognized wine to the user in consideration of various characteristics (e.g., acidity, alcohol content, body feeling, etc.) of the type of wine recognized through the image of the wine.

That is, in the conventional technology, there is a limitation in that the type of wine or food could not be accurately recognized, and food or wine suitable for each recognized wine or food could not be provided, thereby not satisfying the user's needs.

DISCLOSURE

Technical Problem

Provided are an electronic device that identifies a type of each food or wine based on an image of food or wine and location information of the electronic device and provides information on wine or food matched to each identified type of the food or the wine, and a control method thereof.

Technical Solution

In accordance with an aspect of the disclosure, a control method of an electronic device including a camera includes: based on an image of food being acquired through the camera, identifying a type of the food based on the acquired image and location information of the electronic device; identifying a type of at least one wine matched to the identified type of the food based on information about the identified type of the food from among information about a plurality of foods and information about a plurality of wines; and providing information about the identified type of the at least one wine.

The control method may further include: acquiring the location information of the electronic device using a sensor of the electronic device while the image of the food is acquired through the camera; transmitting the acquired location information to an external server; and receiving information about searched food that was previously searched at a location identified based on the location information from the external server.

The control method may further include: acquiring a plurality of food type candidates and probabilities corresponding to the plurality of food type candidates by inputting the acquired image of the food into a first model; and applying a weight to a food type candidate that was previously searched at the location among the plurality of food type candidates based on the information about the searched food.

The control method may further include: acquiring a matching probability of each of the plurality of wines by performing an operation between weights corresponding to a plurality of categories included in the information about the identified type of the food and weights corresponding to a plurality of categories included in the information about the plurality of wines, and identifying the at least one wine among the plurality of wines according to the matching probability.

A plurality of categories included in the information about the plurality of foods may include at least one of food ingredients, cooking methods, spices, or sauces for the plurality of foods, and a plurality of categories included in the information about the plurality of wines may include at least one of body, tannin, acidity, sugar content, or alcohol content for the plurality of wines.

The control method may further include: adjusting the weights corresponding to the plurality of categories included in the information about the identified type of the food and the weights corresponding to the plurality of categories included in the information about the plurality of wines based on pre-stored information related to a user of the electronic device.

The control method may further include: based on information about a type of new food being input from a user, generating weights corresponding to a plurality of categories included in the information about the type of the new food; and acquiring the matching probability of the each of the plurality of wines by performing an operation between the weights corresponding to the plurality of categories included in the information about the type of new food and the weights corresponding to the plurality of categories included in the information about the plurality of wines.

The control method may further include: acquiring the information about the type of the food by recognizing an image matched with the information about the type of the food; transmitting the acquired information about the type of the food to an external server; receiving information about the at least one wine matched to the information about the type of the food among wines included in a place corresponding to the external server from the external server; and providing the received information about the at least one wine.

The control method may further include: providing the acquired image of the food and information about the at least one wine together.

In accordance with an aspect of the disclosure, a control method of an electronic device including a camera includes: based on an image of at least one wine being acquired through the camera, identifying a type of the at least one wine based on the acquired image and location information of the electronic device; identifying at least one food matched to the identified type of the at least one wine based on information about the identified type of the at least one wine among information about a plurality of wines and information about a plurality of foods; and providing information about the at least one food among the information about the plurality of foods.

The control method may further include: acquiring the location information of the electronic device using a sensor of the electronic device while the image of the at least one wine is acquired through the camera; transmitting the acquired location information to an external server; and receiving information about searched wine that was previously searched or sold at a location identified based on the location information from the external server.

The control method may further include: acquiring a plurality of wine type candidates and probabilities corresponding to the plurality of wine type candidates by inputting the acquired image of the at least one wine into a second model; and applying a weight, to a wine type candidate that was previously searched or sold at the location among the plurality of wine type candidates based on the information about the searched wine.

The control method may further include: acquiring a matching probability of each of the plurality of foods by performing an operation between weights corresponding to a plurality of categories included in the information about the identified type of the at least one wine and weights corresponding to a plurality of categories included in the information about the plurality of foods; and identifying the at least one food among the plurality of foods according to the matching probability.

The control method may further include: adjusting the weights corresponding to the plurality of categories included in the information about the identified type of the at least one wine and the weights corresponding to the plurality of categories included in the information about the plurality of foods based on pre-stored information related to a user of the electronic device.

The plurality of categories included in the information about, the plurality of foods may include at least one of food ingredients, cooking methods, spices, or sauces for the plurality of foods, and the plurality of categories included in the information about the plurality of wines may include at least one of body, tannin, acidity, sugar content, or alcohol content for the plurality of wines.

Advantageous Effects

According to embodiments, the electronic device may recognize wine or food more accurately based on the location information of the electronic device and the image of the wine or food, and may provide the user with information on the wine or food suitable for each of the food or wine based on the characteristics and the user's preference of each of the food or wine.

DESCRIPTION OF DRAWINGS

The above and other aspects, features, and advantages of certain embodiments of the present disclosure will be more apparent from the following description taken in conjunction with the accompanying drawings, in which:

FIG. 1 is a diagram for explaining a process in which the electronic device identifies each type of wine or food matched to each of wine or food according to an embodiment;

BEST MODE

The disclosure relates to an electronic device that identifies a type of each wine or food based on an image of the wine or food and location information of the electronic device and provides information on each food or wine matched to each identified type of wine or food, and a control method thereof. The electronic device according to the disclosure may operate in a first mode that provides information on at least one wine matched to an image of food photographed by a user command, or may selectively operate in a second mode that provides information on at least one food matched to a photographed image of wine.

Hereinafter, an operation process of the electronic device of the disclosure will be described in detail with reference to the drawings.

Figure 1A:
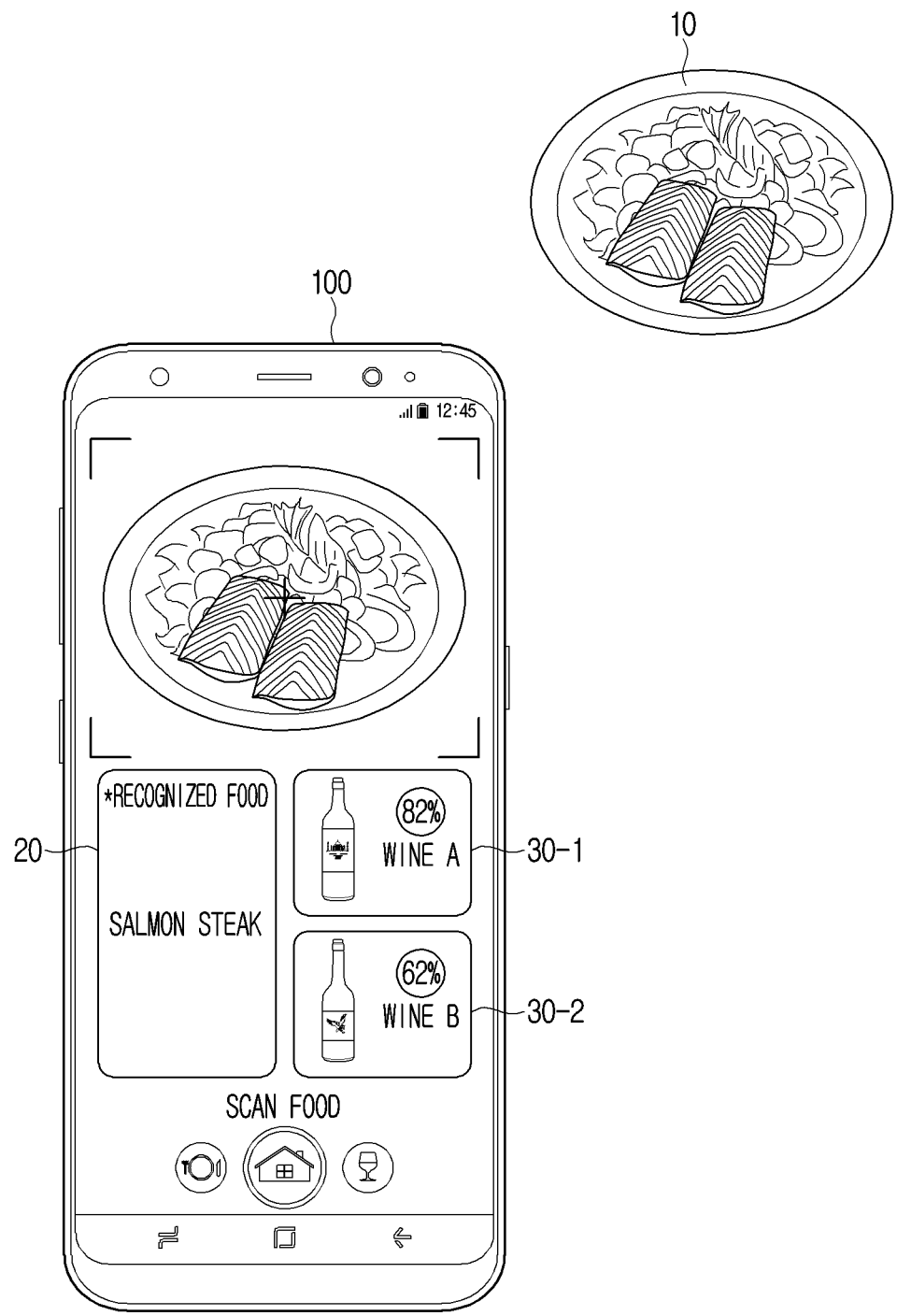
FIG. 1A is a diagram for explaining a process in which an electronic device provides information on wine matched to food based on an image of the food according to an embodiment.

FIG. 1A is a diagram for explaining a process in which an electronic device 100 provides information on wine matched to food based on an image of the food according to an embodiment of the disclosure. That is, FIG. 1A is a diagram for explaining a process in which the electronic device 100 operates in the first mode.

Based on an image of food 10 being acquired through a camera, the electronic device 100 may identify a type of food corresponding to the image based on the acquired image of the food 10 and location information of the electronic device 100.

As an example, while acquiring the image of the food 10 through the camera, the electronic device 100 may acquire location information of the electronic device 100 through a sensor capable of detecting a location of the electronic device 100. As another example, while acquiring the image of the food 10, the electronic device 100 may acquire the location information of the electronic device 100 using a module performing various positioning technologies or location based services.

In addition, the electronic device 100 may transmit the acquired location information to an external server. In this case, the external server may store information on food searched by a plurality of electronic device's users at a specific location, that is, a food search history for each location. Therefore, the electronic device 100 may receive information on food searched at a current location of the electronic device 100 identified based on the location information from the external server. For example, as illustrated in FIG. 1A, the electronic device 100 may transmit the location information of the electronic device 100 to the external server while acquiring an image of food 10, for example a salmon steak, through the camera. In addition, the electronic device 100 may receive information on food searched by other users at the current location of the electronic device 100 from the external server.

In addition, the electronic device 100 may acquire a plurality of food type candidates that may correspond to the image and probabilities corresponding to the plurality of food type candidates by inputting the acquired image of the food 10 into a first model. The first model is an artificial intelligence model trained to identify a type of food corresponding to the input image, and may include various artificial neural networks such as a Convolutional Neural Network (CNN) or a Deep Neural Network (DNN). Therefore, the electronic device 100 may extract feature data for the image through the first model and may acquire one or more food type candidates corresponding to the acquired image and probabilities corresponding to the one or more food type candidates using the extracted feature data. In this case the probabilities corresponding to the one or more food type candidates may mean probabilities that the one or more food type candidates match the type of food displayed in the image.

In addition the electronic device 100 may apply a weight to a type of food searched at the location of the electronic device 100 among the one or more food type candidates based on the information on the food searched at the current location of the electronic device 100. A type of food frequently searched by another user at the current location of the electronic device 100 may have a high probability of being a type of food corresponding to the image acquired by the electronic device 100. Therefore, the electronic device 100 may add an additional weight to the type of food searched at the location of the electronic device 100 among the one or more food type candidates acquired through the first model. For example, the electronic device 100 may acquire information that food type candidates corresponding to the acquired image are a mackerel steak and a salmon steak, a probability that the mackerel steak corresponds to the food 10 is 79%, and a probability that the salmon steak matches the food 10 is 58%, by using the first model. In this case, the electronic device 100 may receive information that 80% of the types of food searched by other users at the current location of the electronic device 100 are salmon steaks from the external server. Therefore, the electronic device 100 may add a weight to the salmon steak among the food type candidates by a ratio of the search for the salmon steak among the entire search history. Based on the probability corresponding to the salmon steak being higher than the probability corresponding to the mackerel steak by adding an additional weight, the electronic device 100 may identify the type of food corresponding to the acquired image as the salmon steak. In this case, the electronic device 100 may display a user interface (UI) 20 indicating the identified type of food, and based on the UI 20 being selected, the electronic device 100 may additionally provide a UI for confirming information on the identified type of food.

In addition, the electronic device 100 may identify the type of one or more wines matching the identified type of food based on information on the identified type of food among information on a plurality of foods and information on a plurality of wines. Specifically, the electronic device 100 may pre-store each of the information on the plurality of foods and the information on the plurality of wines, or may receive each of the information on the plurality of foods and the information on the plurality of wines from the external server. In addition, the information on the plurality of foods may include a plurality of categories, and each category may include at least one of food ingredients, cooking methods, spices, or sauces for food. In addition, the information on the plurality of wines may also include a plurality of categories, and each category may include at least one of body, tannin, acidity, sugar content, or alcohol content for the wine.

In addition, the plurality of categories included in each of the information on the plurality of foods and the information on the plurality of wines may be matched with predefined weights. The electronic device 100 may identify the information on the identified type of food among the information on the plurality of foods. In addition, the electronic device 100 may acquire a matching probability for each of the plurality of wines by performing an operation between the weights corresponding to the plurality of categories included in the information on the identified type of food and the weights corresponding to the plurality of categories included in the information on the plurality of wines. For example, the electronic device 100 may identify the information on the salmon steak among the information on the plurality of foods pre-stored or received from the external server. In addition, the electronic device 100 may acquire a matching probability corresponding to each of the plurality of wines by performing an operation between the weights corresponding to the ingredients, the cooking method, the spices, and the sauce for the salmon steak and the weights corresponding to the plurality of categories included in the information on the plurality of wines. Meanwhile, a predefined connection relationship may exist between the plurality of categories included in the information on the food and the plurality of categories included in the information on the wine. As an example, the food ingredients may be associated with body, tannins, and acidity, the cooking method may be associated with body, acidity, and tannins, the sauce may be associated with acidity and sugar content, and the spice may be associated with sugar content. However, this is only an embodiment, and the connection relationship between the respective categories may be variously modified/added/deleted.

The electronic device 100 may perform a multiplication operation between a weight corresponding to the food ingredient and a weight corresponding to each of the body and acidity, perform a multiplication operation between a weight corresponding to the cooking method and a weight corresponding to each of the body, acidity, and tannin, perform a multiplication operation between a weight corresponding to the sauce and a weight corresponding to the acidity and sugar content, and perform a multiplication operation between a weight corresponding to the spice and a weight corresponding to the sugar content.

In addition, the electronic device 100 may acquire a probability matched to each of the plurality of wines by performing a sum operation on values acquired by performing the multiplication operation according to a proportion matched to each of the food ingredients, the cooking method, the sauce, and the spice. For example, based on the proportion of the food ingredients being 54%, the proportion of the cooking method is 21%, the proportion of the sauce is 13%, and the proportion of the spice is 12%, the electronic device 100 may acquire the probability matched to each of the plurality of wines by summing 54% of the value acquired using the weight corresponding to the food ingredients, 21% of the value acquired through the weight corresponding to the cooking method, 13% of the value acquired through the sauce, and 12% of the value acquired through the spice.

Meanwhile, the electronic device 100 may adjust, the weights corresponding to the plurality of categories included in the information on the identified type of food and the weights corresponding to the plurality of categories included in the information on the plurality of wines based on pre-stored information related to the user of the electronic device. The information related to the user may include at least one of the user's age/gender, preference, event, or taste, but is not limited thereto. Based on information related to the user, such as preference for wine with high sugar content, being pre-stored, the electronic device 100 may increase the weight corresponding to the sugar content among the categories included in the information on the plurality of wines. As another example, based on information related to a user who is sensitive to sour taste among the taste and does not like the sour taste being stored, the electronic device 100 may adjust a weight corresponding to the sour taste among the categories included in the information on the plurality of wines to a low value. As another example, based on information related to the user who determines that the cooking method is more important than the food ingredients of the food being stored, the electronic device 100 may adjust the proportion of the cooking method to be higher than that of the food ingredients as a result of summing the weights.

Meanwhile, the electronic device 100 may identify at least one wine matched to the identified type of food among the plurality of wines by using the acquired matching probability for each of the plurality of wines. For example, the electronic device 100 may identify wine having the highest matching probability as wine matched to the identified type of food. As another example, the electronic device 100 may identify wines up to a preset rank among the wines having a high matching probability as wines matched to the identified type of food. For example, as illustrated in FIG. 1A, the electronic device 100 may identify two wines having a high matching probability as wines corresponding to the identified type of food.

In addition, the electronic device 100 may provide information on types of one or more identified wines among the information on the plurality of wines. Specifically, the electronic device 100 may provide the acquired image of food and the information on the one or more wines together. For example, as illustrated in FIG. 1A, the electronic device 100 may display UIs 30-1 and 30-2 indicating two wines identified as being matched to the food on the acquired image while acquiring the image of food through the camera. The UI may include a wine name and a matching probability of each wine matched to the food corresponding to the image. In addition, based on a corresponding UI being selected, the electronic device 100 may provide additional information on the wine corresponding to the selected UI. For example, the electronic device 100 may provide the body, tannin, acidity, sugar content, and alcohol content of the wine corresponding to the selected UI, and may display a UI for purchasing the wine.

Figure 1B:
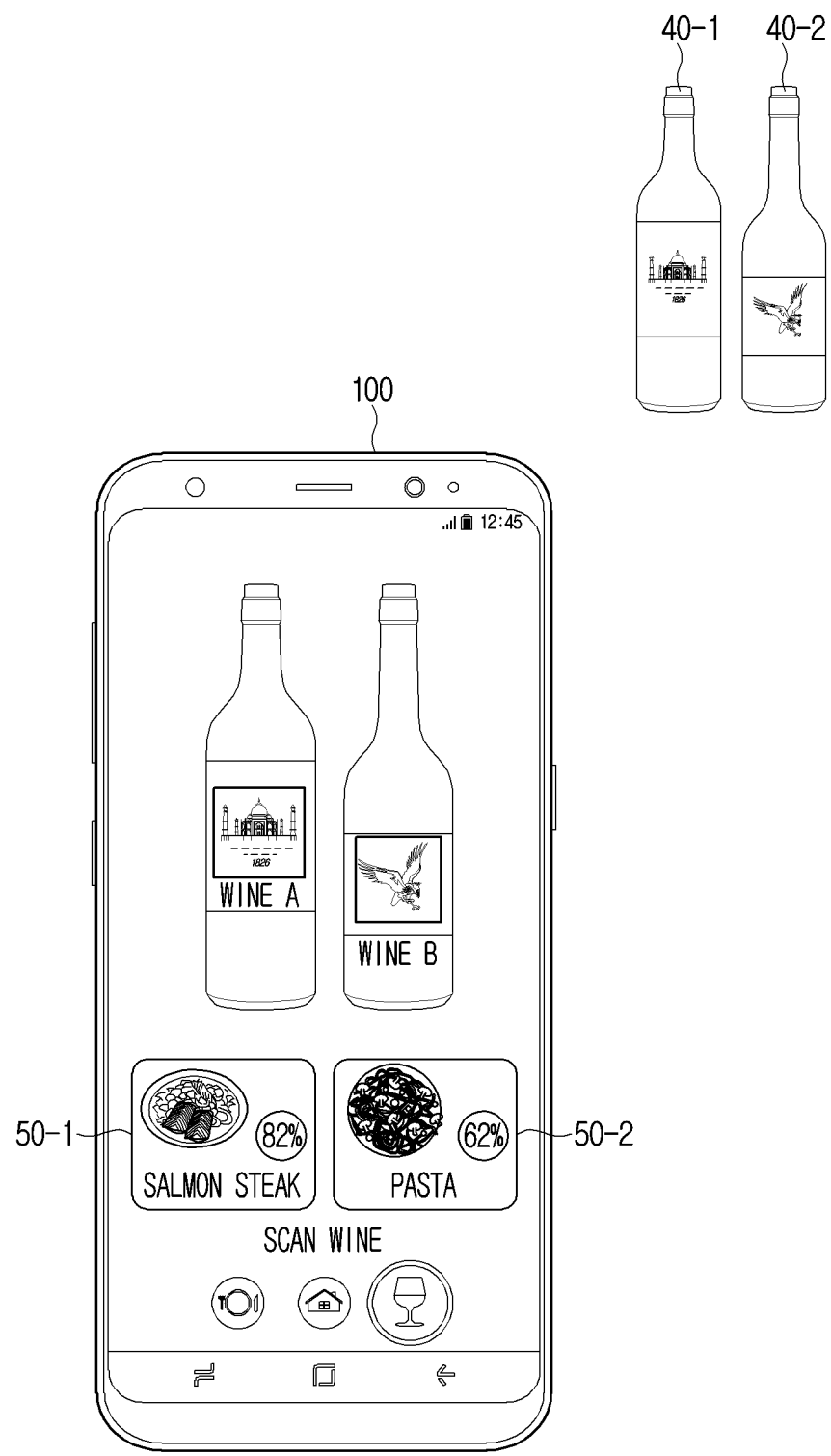
FIG. 1B is a diagram for explaining a process in which the electronic device provides information on food matched to wine based on an image of the wine according to an embodiment.

FIG. 1B is a diagram for explaining a process in which an electronic device 100 provides information on food matched to one or more wines based on images of the one or more wines according to an embodiment of the disclosure. That is, FIG. 1B is a diagram for explaining a process in which the electronic device 100 operates in the second mode.

Based on images of one or more wines 40-1 and 40-2 being acquired through a camera, the electronic device 100 may identify the types of one or more wines corresponding to the images based on the acquired images of the one or more wines 40-1 and 40-2 and location information of the electronic device 100.

Specifically, while acquiring the images of the one or more wines 40-1 and 40-2 through the camera, the electronic device 100 may acquire location information of the electronic device 100. For example, the electronic device 100 may acquire the location information through a sensor capable of detecting a location of the electronic device 100. As another example, the electronic device 100 may acquire the location information of the electronic device by using a module capable of executing a positioning technology or a location-based service.

In addition, the electronic device 100 may transmit the acquired location information to an external server. In this case, the external server may store information on wine searched or sold by a plurality of electronic devices at a specific location, that is, a search history or a sales history for each location. For example, based on the external server being a server capable of managing a wine sales history at a market, which is a current location of the electronic device 100, the external server may transmit a sales history of each wine to the electronic device 100. As another example, the external server 200 may transmit the type of wine searched at the current location of the electronic device 100 to the electronic device 100.

That is, the electronic device 100 may receive information on the wine searched or sold at the location of the electronic device 100 identified based on location information from the external server. For example, as illustrated in FIG. 1A, the electronic device 100 may transmit the location information of the electronic device 100 to the external server while acquiring images of a first wine 40-1 and a second wine 40-2. In addition, the electronic device 100 may receive the information on the wine searched or sold at the current location of the electronic device 100 from the external server.

In addition, the electronic device 100 may acquire a plurality of wine type candidates that may correspond to the images and probabilities corresponding to the plurality of wine type candidates by inputting the acquired images of the one or more wines into a second model. The second model is an artificial intelligence model trained to identify a type of wine corresponding to the input image, and may include various artificial neural networks such as a CNN or a DNN. Therefore, the electronic device 100 may extract feature data for the acquired images through the first model, and may acquire one or more wine type candidates corresponding to the acquired images and probabilities corresponding to the one or more wine type candidates using the extracted feature data. Meanwhile, the first model and the second model may be implemented as the same model, but this is only an example, and the first model and the second model may be implemented as separate models.

In addition, the electronic device 100 may apply a weight to a type of wine searched or sold at the location of the electronic device 100 among the one or more wine type candidates based on the information on the one or more wines searched at the current location of the electronic device 100. A type of wine frequently searched or sold by another user at the location of the electronic device 100 may have a high probability of being a type of wine corresponding to the image actually acquired by the electronic device 100. Therefore, the electronic device 100 may add an additional weight to the type of wine searched or sold at the location of the electronic device 100 among the one or more wine type candidates acquired through the second model.

For example, the electronic device 100 may acquire information that food type candidates corresponding to the acquired image of the first wine 40-1 (assuming that it is actually wine A) are wine A and wine B, a probability that the wine A corresponds to the first wine 40-1 is 52%, and a probability that the wine B matches the first wine 40-1 is 72%, by using the first model. In this case, the electronic device 100 may receive information that 90% of the types of wine searched or sold by other users at the current location of the electronic device 100 are the wine A from the external server. Therefore, the electronic device 100 may add a weight to the wine A among the wine type candidates by a ratio of the search or sale for the wine A among the entire search or sale history. Based on the probability corresponding to the wine A being higher than the probability corresponding to the wine B by adding an additional weight, the electronic device 100 may identify the type of wine corresponding to the acquired image as the wine A. Meanwhile, on the image acquired by the electronic device 100, not only the first wine 40-1 but also the second wine 40-2 exist. Therefore, the electronic device 100 may identify a wine type corresponding to the second wine 40-2 while identifying the wine type corresponding to the first wine 40-1 included in the image based on the location information as described above.

In addition, the electronic device 100 may identify the type of one or more foods matching the identified type of wine based on information on the identified type of wine among the information on the plurality of wines and the information on the plurality of foods. In addition, the electronic device 100 may provide information on types of one or more identified wine among the information on the plurality of wines. In addition, the electronic device 100 may acquire a matching probability for each of the plurality of foods by performing an operation between the weights corresponding to the plurality of categories included in the information on the identified types of one or more wines and the weights corresponding to the plurality of categories included in the information on the plurality of foods. For example, the electronic device 100 may identify the information on the wine A among the information on the plurality of wines pre-stored or received from the external server. In addition, the electronic device 100 may acquire a matching probability corresponding to each of the plurality of foods by performing an operation between the weights corresponding to the body, tannin, acidity, sugar content, and alcohol content of the wine A and the weights corresponding to the plurality of categories included in the information on the plurality of foods. For example, the electronic device 100 may perform a multiplication operation between the weight corresponding to the body and the weight corresponding to each of the food ingredients and the cooking method, perform a multiplication operation between the weight corresponding to the tannin and the weight corresponding to each of the food ingredients and sauces, perform a multiplication operation between the weight corresponding to the acidity and the weight corresponding to the cooking method, and perform a multiplication operation between the weight corresponding to the sugar content and the weight corresponding to the food ingredients. However, this is only an embodiment, and the connection relationship between the respective categories may be variously changed, and the electronic device 100 may perform a weight operation according to the changed connection relationship. In addition, the electronic device 100 may acquire a probability matched to each of the plurality of foods by performing a sum operation on values acquired by performing the multiplication operation according to a proportion matched to each of the body, tannin, acidity, sugar content, and alcohol content.

Meanwhile, the electronic device 100 may adjust the weights corresponding to the plurality of categories included in the information on the identified types of one or more wines and the weights corresponding to the plurality of categories included in the information on the plurality of foods based on pre-stored information related to the user of the electronic device. For example, based on information related to a user, such as preference for a baking method among the cooking methods, being pre-stored, the electronic device 100 may increase a weight corresponding to the baking method among the cooking method categories included in the information on the plurality of foods. As another example, based on information related to the user being stored that determines that the sugar content is more important than the body of the wine, the electronic device 100 may adjust the proportion of the sugar content to be higher than that of the body as a result of summing the weights.

Meanwhile, the electronic device 100 may identify one or more foods matched to the identified types of one or more foods among the plurality of foods according to the matching probability. For example, the electronic device 200 may identify food having the highest matching probability as food matched to the identified type of wine. As another example, the electronic device 100 may identify foods up to a preset rank among the foods having a high matching probability as food matched to the identified type of wine.

In addition, the electronic device 100 may provide information on the identified types of one or more foods among the information on the plurality of foods. Specifically the electronic device 100 may provide the acquired images of one or more wines and the information on one or more foods together. For example as illustrated in FIG. 1B, the electronic device 100 may display UTs 50-1 and 50-2 including information on food having the highest matching probability among the types of food matched to each of the first wine 40-1 and the second wine 40-2. The UI may include a matching probability of food matched to the wine corresponding to the image and a food name. In addition based on a corresponding UI being selected the electronic device 100 may provide additional information on the food corresponding to the selected UI. For example, the electronic device 100 may provide a cooking method food ingredients, sauce, spices and the like of the food corresponding to the selected UI, and may display a UI including a recipe for purchasing or making the corresponding food.

Figure 2:
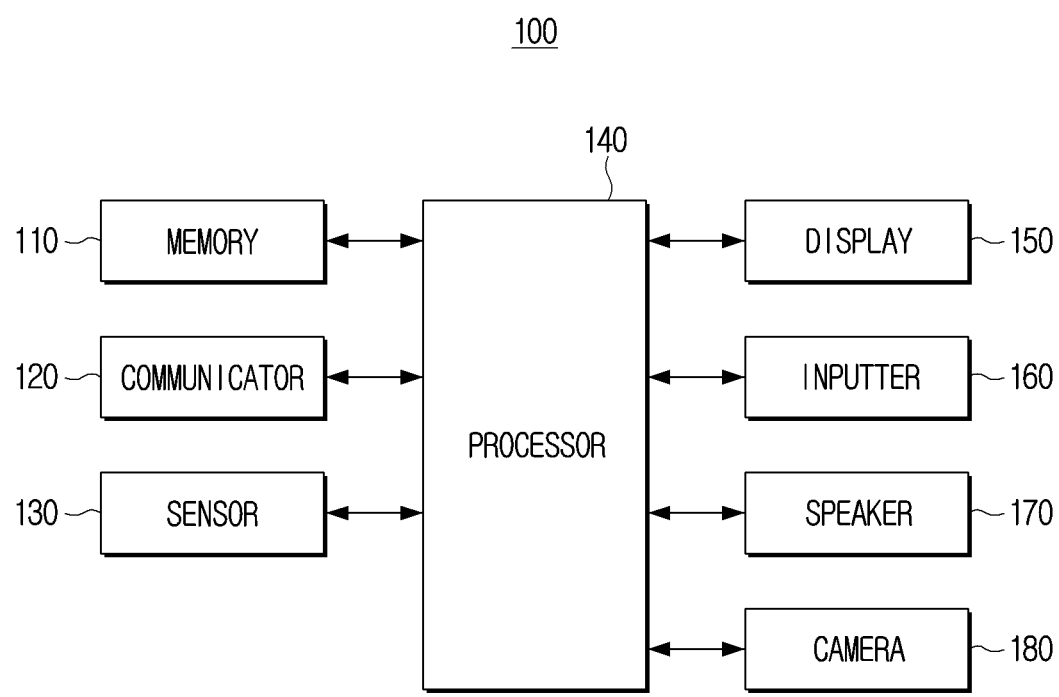
FIG. 2 is a block diagram illustrating a configuration of the electronic device in detail according to an embodiment.

FIG. 2 is a block diagram illustrating a configuration of the electronic device 100 in detail according to an embodiment of the disclosure. As illustrated in FIG. 2 the electronic device 100 may include a memory 110, a communication interface 120, a sensor 130, a processor 140, a display 150 an input interface 160, a speaker 170 and a camera 130. However the configuration illustrated in FIG. 2 is an exemplary diagram for implementing the embodiments of the disclosure, and appropriate hardware and software configurations at levels apparent to those of ordinary skill in the art may be additionally included in the electronic device 100.

The memory 110 may store commands or data related to one or more other components of the electronic device 100. In particular, the memory 110 may be implemented as a non-volatile memory, a volatile memory, a flash memory, a hard disk drive (HDD), a solid state drive (SDD), or the like. In addition, the memory 110 is accessed by the processor 140, and readout, writing, correction, deletion, and the like of data in the memory 110 may be performed by the processor 140. In particular, the memory 110 may store an instruction set corresponding to at least one program executable by the processor 140. The instruction may be one action statement that may be directly executed by the processor 140 in a programming language, and may be a minimum unit for program execution or operation.

In particular, the memory 110 may store information on a plurality of foods and information on a plurality of wines, and may store information related to the user (e.g., information on the user's gender, age, preference, taste, an event input by the user, or the like). In addition, the memory 110 may store the first model, the second model, and a third model that are artificial intelligence models. The third model may be an artificial intelligence model capable of recognizing a text or graphic object included in an image of wine. In addition, the memory 110 may store programs and data for configuring a variety of screens to be displayed on a display region of a display 150.

The communication interface 120 may perform communication with an external device. In this case, the communication connection between the communication interface 120 and the external device may include communicating through a third device (e.g., a repeater, a hub, an access point, a server, or a gateway).

Meanwhile, the communication interface 120 may include various communication modules to perform communication with the external device. As an example, the communication interface 120 may include a wireless communication module, and may include, for example, a cellular communication module that uses at least one of long-term evolution (LTE), LTE Advance (LTE-A), code division multiple access (CDMA), wideband CDMA (WCDMA), 5G, universal mobile telecommunications system (UMTS), Wireless Broadband (WiBro), or Global System for Mobile Communications (GSM). As another example, the wireless communication module may include, for example, at least one of wireless fidelity (WiFi), Bluetooth, Bluetooth low power (BLE), Zigbee, near field communication (KFC), or radio frequency (RF).

In particular, the communication interface 120 may receive the information on the plurality of foods and the information on the plurality of wines from the external server. In addition, the communication interface 120 may transmit the location information of the electronic device 100 to the external server. In addition, the communication interface 120 may receive the information on food searched at the location of the electronic device and the information on wine searched or sold at the location of the electronic device from the external server.

The sensor 130 may detect various state information of the electronic device 100. For example the sensor 130 may include a motion sensor (e.g., a gyro sensor an acceleration sensor etc.) capable of detecting motion information of the electronic device 100 and may include a sensor (e.g. a global positioning system (GPS) sensor etc.) capable of detecting location information thereof. In addition the sensor 130 may include a sensor (e.g., a temperature sensor a humidity sensor an air pressure sensor and the like) capable of detecting environmental information around the electronic device 100, a sensor (e.g., a blood pressure sensor, a blood sugar sensor a pulse rate sensor and the like) capable of detecting user information of the electronic device 100, a sensor (e.g. a UWB sensor an IR sensor a proximity sensor an optical sensor and the like) capable of detecting a presence of the user and the like.

The processor 140 may be electrically connected to the memory 110 to control an overall operation and function of the electronic device 100. In particular, the processor 140 may selectively operate in a first mode or a second mode among a plurality of modes. The processor 140 may receive a user command to operate in the first mode or the second mode through the input interface 160.

In the case in which the processor 140 operates in the first mode, based on an image of food being acquired through a camera 180, the processor 140 may identify a type of food corresponding to the acquired image based on the acquired image of the food and location information of the electronic device 100. Specifically, the processor 140 may acquire the location information of the electronic device through the sensor 130 while acquiring the image of food through the camera 160. In addition, referring to FIG. 3A, the processor 140 may control the communication interface 120 to transmit the acquired location information to an external server 200. The external server 200 may identify the type of food searched at the location of the electronic device 100 among the food search history and transmit the identified information to the electronic device 100. Therefore, the processor 140 may receive information on the food searched at the location of the electronic device identified based on the location information from the external server 200 through the communication interface 120.

Figure 3A:
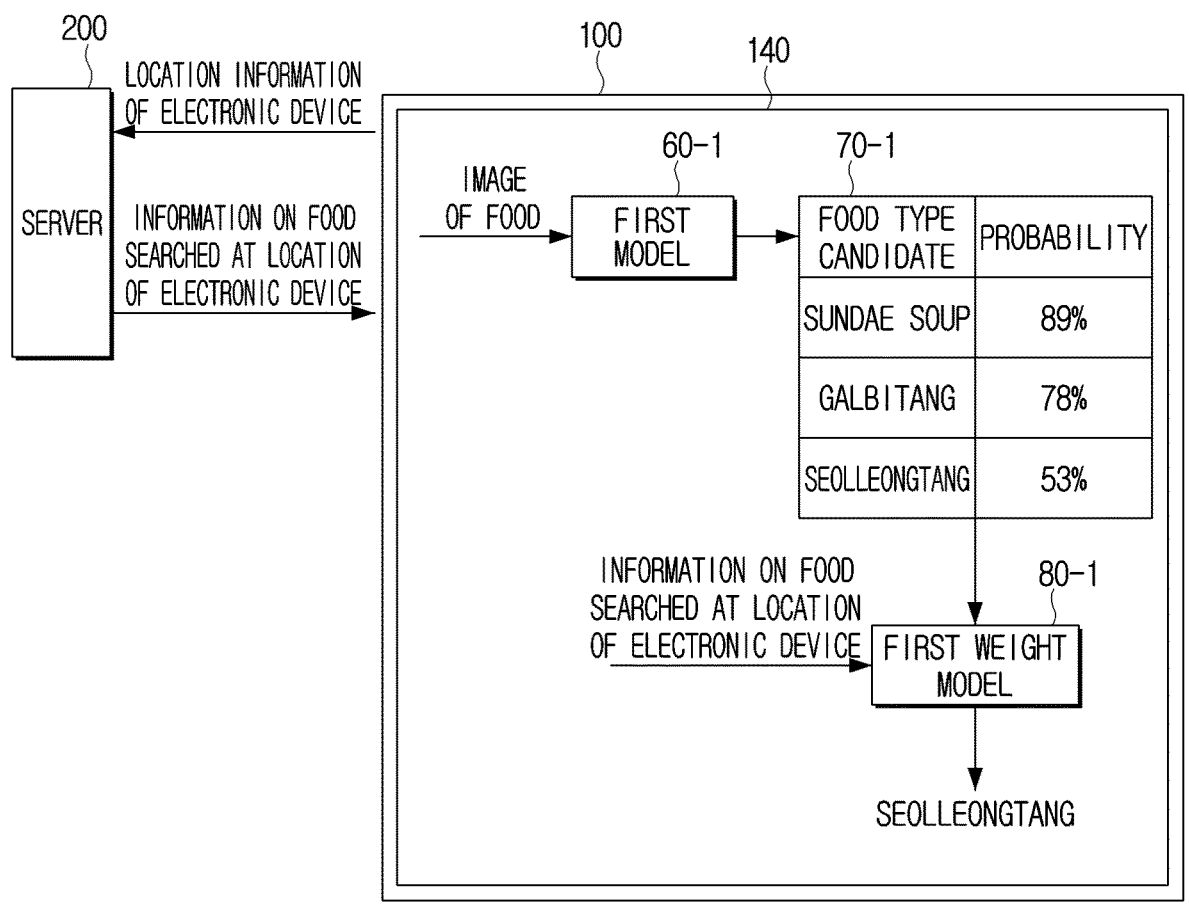
FIG. 3A is a diagram for explaining a process in which the electronic device identifies a type of food through an image of the food according to an embodiment.

In addition, referring to FIG. 3A, the processor 140 may acquire a plurality of food type candidates and probabilities 70-1 corresponding to the plurality of food type candidates by inputting the acquired image of food into a first model 60-1. For example, the processor 140 may acquire information that a probability that the food corresponding to the image is sundae soup is 89%, a probability that the food corresponding to the image is galbitang is 78%, and a probability that the food corresponding to the image is seolleongtang is 53% through the first model 60-1.

In addition, the processor 140 may apply a weight to a type of food searched at the location of the electronic device among the plurality of food type candidates based on the information on the food searched at the location of the electronic device. That is, the processor 140 may additionally apply a weight to the type of food searched at the location of the electronic device among the plurality of food type candidates according to a search ratio. For example, the processor 140 may input information on the food searched at the location of the electronic device and the probabilities 70-1 corresponding to the plurality of food type candidates to a first weight module 80-1. For example, based on 80%, of all search histories searched at the location of the electronic device being seolleongtang, the first weight module 80-1 may apply a weight corresponding to the search history (80% ratio) to the probability of seolleongtang. Based on the probability corresponding to seolleongtang being corrected by the first weight module 80-1 as having the highest probability, the processor 140 may identify seolleongtang as a type of food corresponding to the image. That is, the processor 140 may identify the candidate having the highest probability among the plurality of food type candidates as the type of food corresponding to the acquired image.

Meanwhile, as an example, based on the probability corresponding to all of the plurality of food type candidates being less than a threshold value, the processor 140 may control the display 150 to display a text or graphic object representing a plurality of food candidates. In addition, based on one of the text or graphic object representing the plurality of food candidates being selected by the user, the processor 140 may identify the food corresponding to the selected text or graphic object as the type of food corresponding to the image.

As another example, the processor 140 may provide the text or graphic object representing the plurality of food type candidates in order of high probability. In this case, based on one of the text or graphic object representing the plurality of food candidates being selected by the user, the processor 140 may identify the food corresponding to the selected text or graphic object as the type of food corresponding to the image. Therefore, the type of food corresponding to the image may be determined by the selection of the user.

In addition, the processor 140 may identify the type of one or more wines matching the identified type of food based on the information on the identified type of food among information on the plurality of foods and information on the plurality of wines. Specifically, the processor 140 may acquire a matching probability for each of the plurality of wines by performing an operation between the weights corresponding to the plurality of categories included in the information on the identified type of food and the weights corresponding to the plurality of categories included in the information on the plurality of wines.

Figure 4:
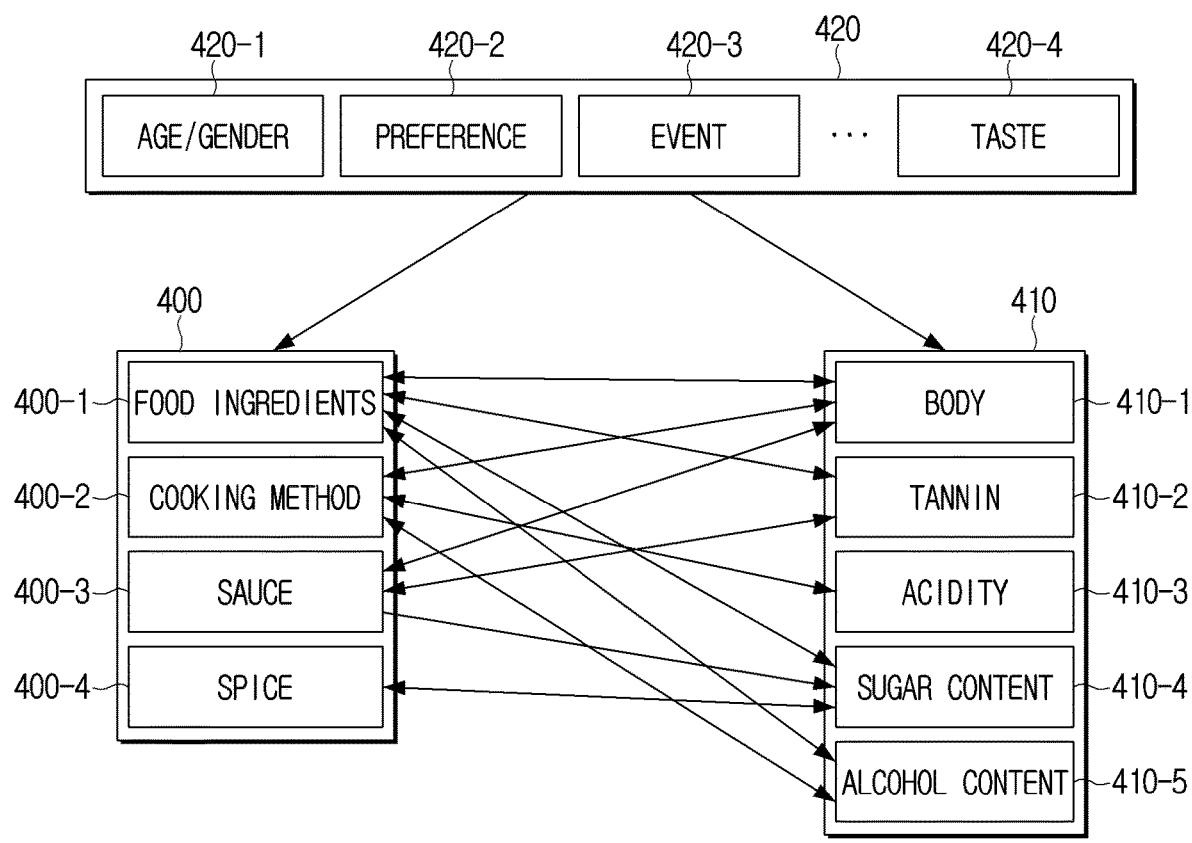

For example, as illustrated in FIG. 4, the processor 140 may perform a multiplication operation between a weight corresponding to food ingredients 400-1 among the information 400 on the identified type of food and weights corresponding to a body 410-1, tannin 410-2, acidity 410-3, sugar content 410-4, and alcohol content 410-3 connected to the food ingredients 400-1 among the information on the wine. In addition, the processor 140 may perform a multiplication operation between a weight corresponding to a cooking method 400-2 among the information on the identified type of food and the weights corresponding to the body 410-1, the tannin 410-2, and alcohol content 410-5 connected to the cooking method 400-2. In addition, the processor 140 may perform a multiplication operation between a weight corresponding to each of a sauce 400-3 and a spice 400-4 and weights corresponding to categories connected to the sauce 400-3 and the spice 400-4. Meanwhile, the connection relationship between the plurality of categories included in the information on the identified type of food and the plurality of categories included in the information on the plurality of wines may be predefined, but this is only an example and may be changed/added/deleted by the user.

In addition, the processor 240 may acquire a matching probability by performing a sum operation on a numerical value acquired by performing the multiplication operation according to a predefined proportion of each of the food ingredients, the cooking method, the sauce, and the spice. For example, based on the proportions of the food ingredients, cooking method, sauce, and spice being 54%, 21%, 13%, and 12%, respectively, the processor 140 may obtain a sum of 54% of the value acquired using the weight corresponding to the food ingredients, 21% of the value acquired using the weight corresponding to the cooking method, 13% of the value acquired using the weight corresponding to the sauce, and 12% of the value acquired using the weight corresponding to the spice. Meanwhile, the weight of each category may be predefined, but this is only an example and may be changed by a user command.

In addition, the processor 140 may adjust the weights corresponding to the plurality of categories included in the information on the identified type of food and the weights corresponding to the plurality of categories included in the information on the plurality of wines based on pre-stored information related to the user of the electronic device 100. That is, the processor 140 may identify wine matched to the food among the plurality of wines by reflecting the information related to the user. As illustrated in FIG. 4, information 420 related to the user may be pre-stored in the memory 110. Therefore, the processor 140 may adjust the weights corresponding to the categories included in the information on the plurality of food or wines by using a parameter matched to at least one of an age/gender 420-1, a preference 420-2, an event 420-3, or a taste 420-4 among the information 420 related to the user.

Meanwhile, the processor 140 may pre-store information on the plurality of food and information on the plurality of wines in the memory 110. As another example, the processor 140 may receive the information on the plurality of foods and the information on the plurality of wines from the external server through the communication interface 120.

In addition, the processor 140 may identify at least one wine matched to the identified type of food among the plurality of wines by using the acquired matching probabilities for the plurality of wines. In addition, the processor 140 may provide information on a type of at least one identified wine among the information of the plurality of wines. For example, the processor 140 may control the display 150 to display a UI corresponding to the type of at least, one identified wine while displaying the image of food. In addition, based on the UI corresponding to at least one wine being selected, the processor 140 may control the display 150 to display information on the wine corresponding to the selected UI.

Meanwhile, as another example of the disclosure, based on information on a type of new food being input from the user, the processor 140 may generate weights corresponding to a plurality of categories included in the information on the type of new food. For example, based on food ingredients, a cooking method, a sauce, and a spice of the type of new food being input, the processor 140 may generate a weight corresponding to each input food ingredients, cooking method, sauce, and spice. In addition, the processor 140 may acquire a matching probability for each of the plurality of wines by performing an operation between the weights corresponding to the plurality of categories included in the generated information on the type of new food and the weights corresponding to the plurality of categories included in the information on the plurality of wines.

In addition, as another example of the disclosure, the processor 140 may acquire information on the type of food by recognizing an image (e.g., barcode, RFID, and the like) to which the information on the type of food is matched through the camera 180. For example, the processor 140 may identify the type of food currently selected by the user as salmon steak by recognizing a barcode attached to a salmon steak product using a barcode recognition module of the camera ISO.

In addition, the processor 140 may control the communication interface 120 to transmit the acquired information on the type of food to the external server. In addition, the processor 140 may receive information on at least one wine matched to the acquired information on the type of food among the wines included in the place corresponding to the external server from the external server through the communication interface 120. For example, the external server may be implemented as a server including a model capable of managing the inventory of a market that sells goods and providing wine matched to food. Therefore, based on information that the type of food selected by the user is salmon steak being received, the external server may identify wines matched to the salmon steak, and identify information on the wine that is stocked in the market among the identified wines. Therefore, the processor 140 may receive information on at least one wine matched to the acquired information on the type of food among the wines included in the place corresponding to the external server from the external server. In this case, the information on the at least one wine may include various characteristics of the wine (body, tannin, acidity, sugar content, alcohol content, and the like) and information on a location where the wine may be purchased. In addition, the processor 140 may provide the information on the at least one wine received from the external server.

Meanwhile, the processor 140 may operate in the second mode among the plurality of modes. As a result of the processor 140 acquiring an image of at least one wine through the camera 180 while operating in the second mode, the processor 140 may identify a type of wine corresponding to at least one image based on the acquired image of the at least one wine and location information of the electronic device. Specifically, the processor 140 may acquire the location information of the electronic device 100 through the sensor 130 while acquiring the image of the at least one wine through the camera 180. In addition, as illustrated in FIG. 38, the processor 140 may control the communication interface 120 to transmit the acquired location information to the external server 200, and may receive information on the wine searched or sold at the location of the electronic device 100 identified based on the location information from the external server 200 through the communication interface 120.

Figure 3B:
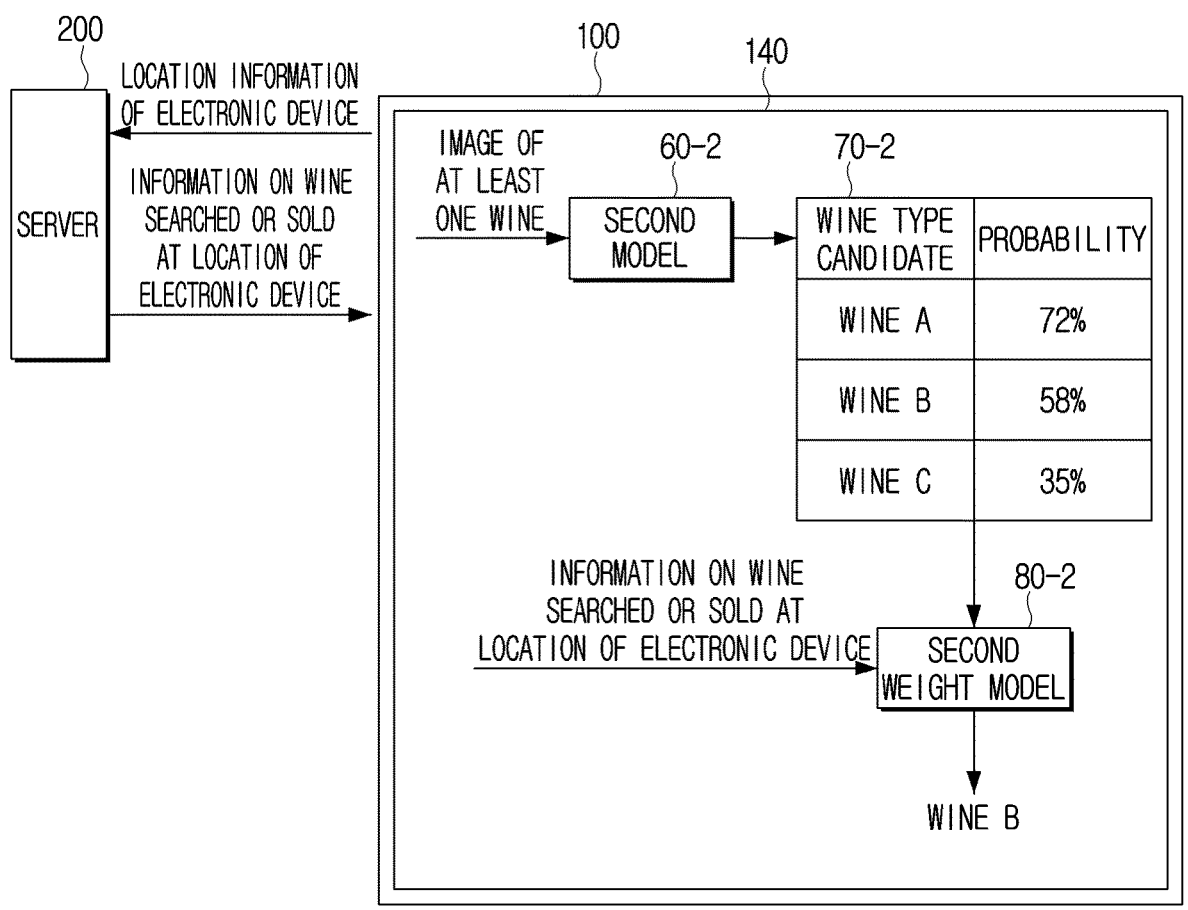
FIG. 3E is a diagram for explaining a process in which the electronic device identifies a type of wine through an image of the wine according to an embodiment.

In addition, the processor 140 may acquire a plurality of wine type candidates and probabilities corresponding to the plurality of wine type candidates by inputting the acquired image of the at least one wine into the second model. In addition, the processor 140 may additionally apply a weight to a type of food searched or sold at the location of the electronic device among the plurality of wine type candidates based on the information on the wine searched or sold at the location of the electronic device. For example, as illustrated in FIG. 3B, the processor 140 may acquire a plurality of wine type candidates and probabilities 70-2 corresponding to the plurality of wine type candidates by inputting an image of at least one wine into the second model 60-2. For example, the processor 140 may acquire information that a probability that the wine corresponding to the image is wine A is 72%, a probability that the wine corresponding to the image is wine B is 58%, and a probability that the wine corresponding to the image is wine C is 35% through the second model 60-2.

In addition, the processor 140 may apply a weight to a type of wine searched or sold at the location of the electronic device among the plurality of wine type candidates based on the information on the food searched at the location of the electronic device. That is, the processor 140 may additionally apply a weight to the type of wine searched or sold at the location of the electronic device among the plurality of wine type candidates according to a search or sale ratio. For example, the processor 140 may input the information on the wine searched or sold at the location of the electronic device and the probabilities 70-2 corresponding to the plurality of wine type candidates to a second weight module 80-2. For example, based on 80% of all search or sale histories searched at the location of the electronic device being the wine B, the second weight module 80-2 may additionally apply a weight corresponding to the search or sale history (80% ratio) to the probability of the wine B. Based on the probability corresponding to the wine B being corrected by the second weight module 80-2 as having the highest probability, the processor 140 may identify the wine B as the type of wine corresponding to the image. That is, the processor 140 may identify the candidate having the highest probability among the plurality of wine type candidates as the wine of food corresponding to the acquired image.

Meanwhile, as an example, being the probability corresponding to all of the plurality of food type candidates being less than a threshold value, the processor 140 may control the display 150 to display a text or graphic object representing the plurality of wine candidates. In addition, based on one of the text or graphic object representing the plurality of wine candidates being selected by the user, the processor 140 may identify the wine corresponding to the selected text or graphic object as the type of wine corresponding to the image.

As another example, the processor 140 may provide the text or graphic object representing the plurality of wine type candidates in order of high probability. In this case, based on one of the text or graphic object representing the plurality of wine candidates being selected by the user, the processor 140 may identify the wine corresponding to the selected text or graphic object as the type of wine corresponding to the image.

In addition, the processor 140 may acquire a matching probability for each of the plurality of foods by performing an operation between the weights corresponding to the plurality of categories included in the information on the identified type of wine and the weights corresponding to the plurality of categories included in the information on the plurality of foods. For example, as illustrated in FIG. 4, the processor 140 may perform a multiplication operation between the weight corresponding to the body 410-1 among the information 410 on the identified type of wine and the weights corresponding to the food ingredients 400-1, the cooking method 400-2, and the sauce 400-3 connected to the body 410-1 among the information on the plurality of foods. In addition, the processor 140 may perform a multiplication operation between the weight corresponding to the tannin 410-2 among the information on the identified type of wine and the weights corresponding to the food ingredients 400-1 and the sauce 400-3 connected to the tannin 410-2. In addition, the processor 140 may perform a multiplication operation between a weight corresponding to each of the acidity 410-3, the sugar content 410-4, and the alcohol 410-5 and a weight corresponding to a category connected to each of the acidity 410-3, the sugar content 410-4, and the alcohol 410-5. Meanwhile, the connection relationship between the plurality of categories included in the information on the identified type of wine and the plurality of categories included in the information on the plurality of wines may be predefined, but this is only an example and may be changed/added/deleted by the user.

In addition, the processor 140 may acquire a matching probability of each of the plurality of foods by performing a sum operation on a numerical value acquired by performing the multiplication operation according to a proportion of each of the body, the tannin, the acidity, the sugar content, and the alcohol content. For example, being the proportions of the body, the tannin, the acidity, the sugar content, and the alcohol content being 25%, 20%, 18%, 21%, and 16%, respectively, the processor 140 may acquire the matching probability of each of the plurality of foods by calculating a sum of 25% of the value acquired using the weight corresponding to the body, 20% of the value acquired using the weight corresponding to the tannin, 18% of the value acquired using the weight corresponding to the acidity, 21% of the value acquired using the weight corresponding to the sugar content, and 16% of the value acquired using the weight corresponding to the alcohol content. Meanwhile, the weight of each category may be predefined, but this is only an example and may be changed by a user command.

In addition, the processor 140 may adjust the weights corresponding to the plurality of categories included in the information on the identified type of wine and the weights corresponding to the plurality of categories included in the information on the plurality of foods based on pre-stored information related to the user of the electronic device 100. That is, the processor 140 may identify food matched to the identified type of wine among the plurality of foods by reflecting the information related to the user. As illustrated in FIG. 4, the processor 140 may adjust the weights corresponding to the categories included in the information on the plurality of food or wines by using a parameter matched to at least one of an age/gender 420-1, a preference 420-2, an event 420-3, or a taste 420-4 among the information 420 related to the user pre-stored in the memory 110.

In addition, the processor 140 may identify at least one food matched to the identified types of wine among the plurality of foods according to the matching probability. In addition, the processor 140 may provide information on a type of at least one identified food among the information of the plurality of foods. For example, the processor 140 may control the display 150 to display a UI corresponding to the type of at least one identified food while displaying the image of wine. In addition, based on the UI corresponding to at least one food being selected, the processor 140 may control the display 150 to display information on the food corresponding to the selected UI.

In addition, as another example of the disclosure, the processor 140 may acquire information on the type of food by recognizing an image (e.g., barcode, RFID, a label capable of identifying the type of wine, and the like) to which the information on the type of wine is matched through the camera 180. For example, the processor 140 may identify the type of wine currently selected by the user as the wine A by recognizing a barcode attached to a wine A bottle using a barcode recognition module of the camera 180.

In addition, the processor 140 may control the communication interface 120 to transmit the acquired information on the type of wine to the external server. In addition, the processor 140 may receive information on at least one food matched to the acquired information on the type of wine among the foods included in the place corresponding to the external server from the external server through the communication interface 120. For example, the external server may be implemented as a server including a model capable of managing the inventory of a market that sells goods and providing food matched to wine. Therefore, based on information that the type of wine selected by the user is the wine A being received, the external server may identify foods matched to the wine A, and identify information on the food that is stocked in the market among the identified foods. Therefore, the processor 140 may receive information on at least one food matched to the acquired information on the type of wine among the foods included in the place corresponding to the external server from the external server. In this case, the information on the at least one food may include various characteristics of the food (e.g., food ingredients, cooking method, sauce, spice, and the like) and information on a location where the food may be purchased.

In addition, the processor 140 may provide the information on the at least one food received from the external server.

Meanwhile, as another example of the disclosure, the processor 140 may identify the text or object included in the image of at least one wine acquired through the camera 180 using a third model. The third model may be an artificial intelligence model capable of recognizing a text or graphic object included in an image of wine. In addition, the processor 140 may provide a message notifying an event matched to the identified text or graphic; object among user events pro-stored in the memory 110. For example, the processor 140 may identify that a graphic object representing a pair of ducks is included in the image of wine. In addition, the processor 140 may identify that an event corresponding to a graphic object representing the pair of ducks is a wedding anniversary. Therefore, the processor 140 may control the display 150 to display a message UI informing of the wedding anniversary event corresponding to the pair of ducks among the pre-stored events, or may control the speaker 170 to notify the event in the form of voice.

In addition, the functions related to the artificial intelligence according to the disclosure are operated through the processor 140 and the memory 110. The processor may be configured as one or a plurality of processors. At this time, one or the plurality of processors may be a general-purpose processor such as a CPU, an AP, or a digital signal processor (DSP), a graphic-dedicated processor such as a GPU or a vision processing unit (VPU), or an artificial intelligence dedicated processor such as an NPU. One or the plurality of processors perform a control to process input data according to predefined operating rules or artificial intelligence models stored in the memory. Alternatively, based on one or the plurality of processors being an artificial intelligence dedicated processor, the artificial intelligence dedicated processor may be designed in a hardware architecture specialized for the processing of a specific artificial intelligence model.

The predefined operating rules or artificial intelligence models are characterized by being created through training. For example, a basic artificial intelligence model may be trained by using a plurality of training data by a training algorithm, thereby creating the predefined motion rules or artificial intelligence models set to perform a desired characteristic (or purpose). Such training may be performed in a device itself in which the artificial intelligence according to the disclosure is performed, or may also be performed through a separate server and/or system. An example of the learning algorithm includes supervised learning, unsupervised learning, semi-supervised learning, or reinforcement learning, but the learning algorithm is not limited to the example described above.

The artificial intelligence model may include a plurality of neural network layers. Each of the plurality of neural network layers has a plurality of weight values and performs a neural network operation through an operation between an operation result of a previous layer and the plurality of weights. The plurality of weights of the plurality of neural network layers may be optimized by a learning result of the artificial intelligence model. For example, the plurality of weights may be updated so that a loss value or a cost value acquired from the artificial intelligence model is reduced or minimized during a learning process. The artificial neural, network may include a deep neural network (DNN), and an example thereof includes a convolutional neural network (CNN), a deep neural network (DNN), a recurrent neural network (RNN), a restricted Boltzmann machine (RBM), a deep belief network (DBM), a bidirectional recurrent deep neural network (BRDNN), or deep Q-networks, but is not limited to the example described above.

In addition, the visual understanding performed by the artificial intelligence model is a technology of recognizing and processing objects like human's vision, and includes object recognition, object tracking, image retrieval, human recognition, scene recognition, 3D reconstruction/localization, image enhancement, and the like.

The display 150 may display various types of information according to the control of the processor 140. In particular, the display 150 may display a UI including the information on the wine matched to the identified type of food or a UI including the information on the food matched to the identified type of wine. In addition, the display 150 may display the image acquired through the camera 180. Meanwhile, the display 150 may be implemented as a touch screen together with a touch panel, or may be implemented as a flexible display panel.

The input interface 160 may receive a user input for controlling the electronic device 100. In particular, the input interface 160 may include a touch panel for receiving a user touch using a user's hand or a stylus pen, and a button for receiving a user manipulation. In addition, the input interface 160 may be implemented as another input device (e.g., a keyboard, a mouse, a motion inputter, and the like).

For example, the input interface 160 may receive a user input for selecting one of UIs including the information on at least one wine matched to the identified type of food. As another example, the input interface 160 may receive a user input for selecting one of UIs including the information on at least one food matched to the identified type of wine. As another example, the input interface 160 may receive a user input to operate in one of the first mode and the second mode.

The speaker 170 is a component that outputs not only various audio data on which various processing tasks such as decoding, amplification, and noise filtering have been performed by an audio processor, but also various notification sounds or voice messages. In particular, the speaker 170 may output information on the type of wine or food that is matched to the type of food or wine identified through the image in a form of voice. Meanwhile, the component for outputting audio may be implemented as a speaker, but this is only an example, and may be implemented as an output terminal capable of outputting audio data.

The camera 130 is a component for photographing the surroundings of the electronic device 100. In particular, the camera 180 may acquire an image of food or wine by photographing food or wine located in the vicinity of the electronic device 100. The camera 130 may acquire a single frame as well as a picture including a continuous image by photographing the food or wine. In addition, the camera 180 may be implemented in various ways depending on a type of the electronic device 100, such as an RGB-D camera, a 3D-camera, and an infrared camera. In addition, the camera 130 may additionally include a module capable of recognizing barcodes, RFID, labels, and the like.

Figure 5:
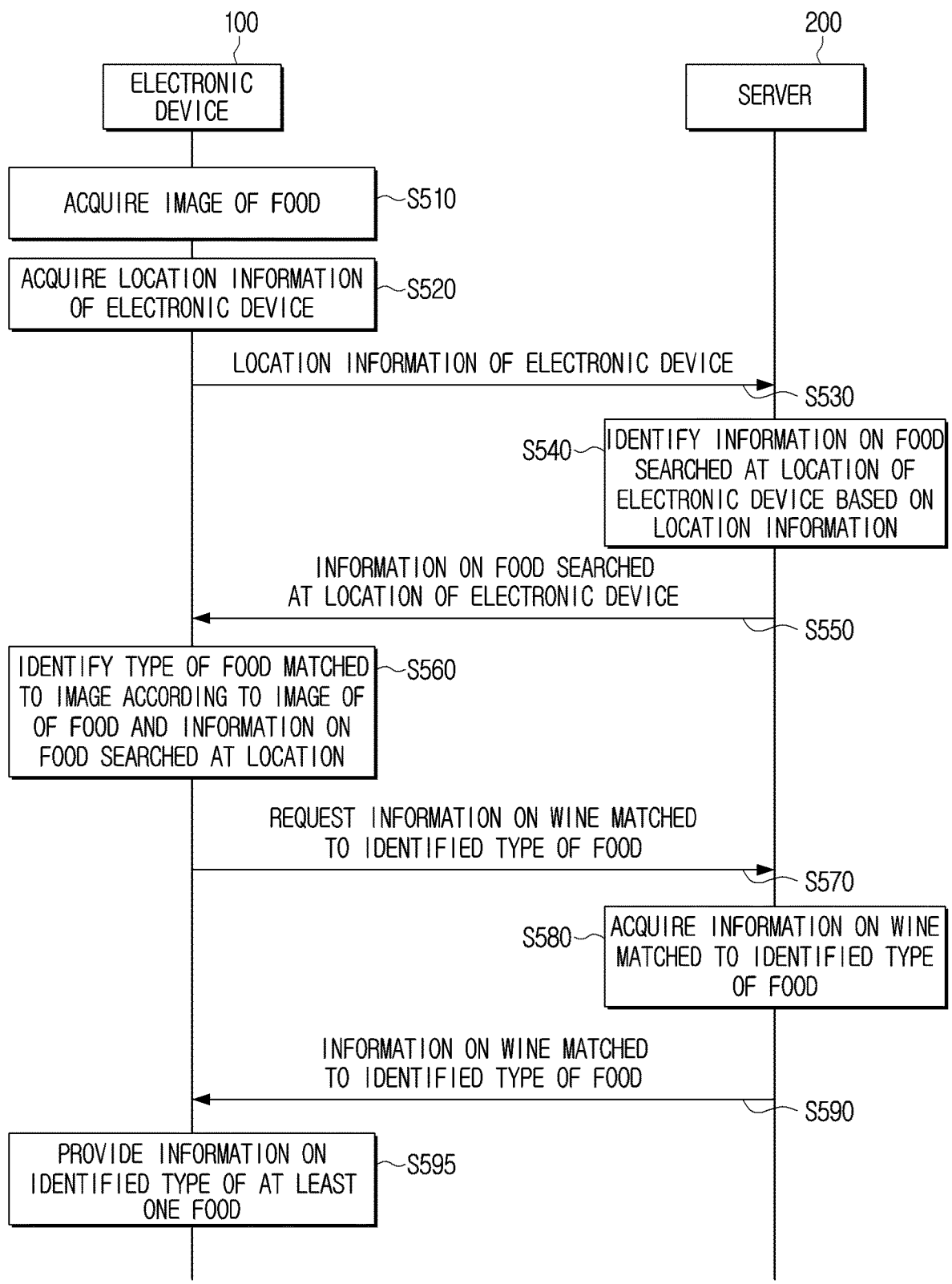
FIG. 5 is a sequence diagram for explaining operations of an electronic device and a server according to an embodiment.
Figure 6:
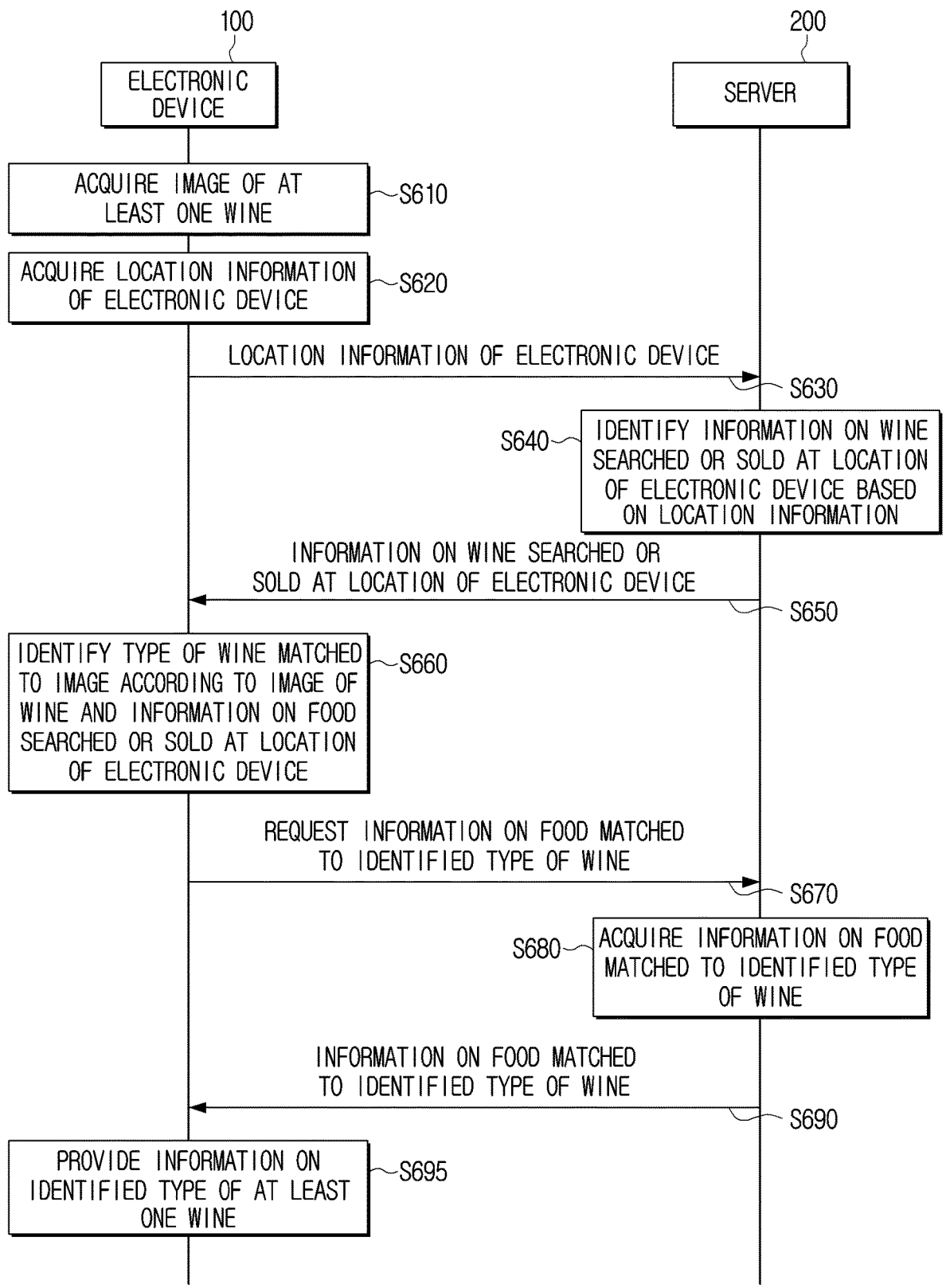
FIG. 6 is a sequence diagram for explaining operations of the electronic device and the server according to an embodiment.

FIGS. 5 and 6 are sequence diagrams for explaining operations between the electronic device 100 and the server 200 according to an embodiment of the disclosure. FIGS. 5 and 6 are sequence diagrams for explaining an example of the case in which the information on each of the plurality of foods and wines is stored in the server 200, and a model that identifies the wine or food matched to food or wine is stored in the server 200. In addition, FIG. 5 is a sequence diagram related to the case in which the electronic device 100 operates in the first mode, and FIG. 6 is a sequence diagram related to the case in which the electronic device 100 operates in the second mode.

Referring to FIG. 5, the electronic device 100 may acquire an image of food while operating in the first mode at operation S510. In addition, the electronic device 100 may acquire location information of the electronic device 100, at operation S520. Specifically, the electronic device 100 may acquire the location information of the electronic device by using a sensor capable of detecting a location or a module capable of using a location-based service. Meanwhile, S510 and S520 may be performed simultaneously or performed within a threshold time difference. In addition, the electronic device 100 may transmit the acquired location information of the electronic device 100 to the server 200, at operation S530.

In addition, the server 200 may identify information on the food searched at the location of the electronic device 100 based on the location information, at operation S540. Specifically, the server 200 may identify information on the food searched at the location of the electronic device 100 among all stored search histories for food. In addition, the server 200 may transmit the information on the food searched at the identified location of the electronic device to the electronic device 100, at operation SS50.

The electronic device 100 may identify a type of food matched to the image based on the image of the food acquired through the camera and the information on the food searched at the location of the electronic device 100, at operation S560. The description related to S560 has been described above, and the redundant description will be thus omitted. In addition, the electronic device 100 may transmit a signal requesting information on wine matched to the identified type of food to the server 200, at operation S570.

The server 200 may acquire the information on the wine matched to the identified type of food, at operation S580. The server 200 may acquire a matching probability for each of the plurality of wines by performing an operation between weights corresponding to a plurality of categories included in the information on the wine matched to the identified type of food and weights corresponding to a plurality of categories included in information on a plurality of wines. In addition, the server 200 may identify wine having the highest matching probability or wines up to a preset rank in the order of a high matching probability as wines matched to the food corresponding to the image acquired by the electronic device 100. In addition, the server 200 may transmit the information on the wine matched to the identified type of food to the electronic device 100, at operation S590. In addition, the electronic device 100 may provide information on the identified type of at least one food, at operation S595.

Meanwhile, FIG. 6 is a sequence diagram for explaining an example as a result of the electronic device 200 operating in the second mode. First, the electronic device 100 may acquire an image of wine while operating in the second mode, at operation S610. In addition, the electronic device 100 may acquire location information of the electronic device 100, at operation S620. Meanwhile, S610 and S620 may be performed simultaneously or performed within a threshold time difference. In addition, the electronic device 100 may transmit the acquired location information of the electronic device 100 to the server 200, at operation S630.

In addition, the server 200 may identify information on the wine searched or sold at the location of the electronic device 100 based on the location information of the electronic device, at operation S640. Specifically, the server 200 may identify the information on the wine searched or sold at the location of the electronic device 100 among all stored search or sale histories for wine. In addition, the server 200 may transmit the information on the wine searched or sold at the location of the electronic device to the electronic device 100, at operation S650.

In addition, the electronic device 100 may identify a type of wine matched to the image based on the image of the wine and the information on the wine searched or sold at the location of the electronic device, at operation S660. The description related to S660 has been described above, and the redundant description will be thus omitted. In addition, the electronic device 100 may transmit a signal requesting information on food matched to the identified type of wine to the server 200, at operation S670.

In addition, the server 200 may acquire the information on the food matched to the identified type of wine, at operation S680. Specifically, the server 200 may acquire a matching probability for each of the plurality of foods by performing an operation between the weights corresponding to the plurality of categories included in the information on the food matched to the identified type of wine and the weights corresponding to the plurality of categories included in the information on the plurality of Foods. In addition, the server 200 may identify food having the highest matching probability or foods up to a preset rank in the order of a high matching probability as foods matched to the wine corresponding to the image acquired by the electronic device 100. In addition, the server 200 may transmit the information on the food matched to the identified type of wine to the electronic device 100, at operation S690. In addition, the electronic device 100 may provide information on the identified type of at least one wine, at operation S695.

Figure 7:
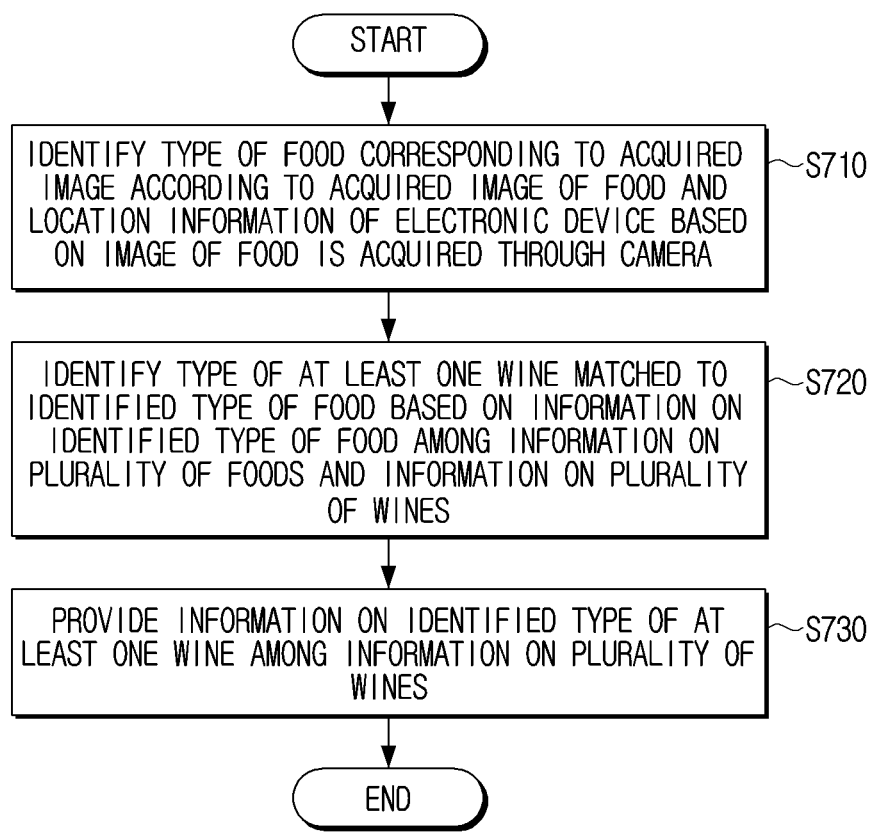
FIG. 7 is a diagram for explaining a control method of an electronic device according to an embodiment.

FIG. 7 is a flowchart for explaining a control method of the electronic device 100 according to an embodiment of the disclosure. First, based on an image of food being acquired through a camera, the electronic device 100 may identify a type of food corresponding to the acquired image based on the acquired image of the food and location information of the electronic device, at operation S710. Specifically, the electronic device 100 may acquire the location information through a sensor, or may acquire the location information of the electronic device 100 by using a variety of communication modules. In addition, the electronic device 100 may acquire feature data of the image, and acquire a plurality of food type candidates corresponding to the image and a probability corresponding to each candidate by using the acquired feature data. In addition, the electronic device 100 may apply a weight to a type of food searched at the location of the electronic device among the plurality of food type candidates based on information on the food searched at the location of the electronic device. Therefore, the electronic device 100 may identify the food corresponding to the highest probability based on the weight being applied as the food corresponding to the image.

In addition, the electronic device 100 may identify the type of at least one wine matched to the identified type of food based on the information on the identified type of food among information on a plurality of foods and information on a plurality of wines, at operation S720. Specifically, the electronic device 100 may acquire a matching probability for each of the plurality of wines by performing an operation between the weights corresponding to the plurality of categories included in the information on the identified type of food and the weights corresponding to the plurality of categories included in the information on the plurality of wines. In addition, the electronic device 100 may identify a type of wine having the highest matching probability or types of a plurality of wines having a high matching probability up to a preset rank as the type of wine matched to the identified type of food.

In addition, the electronic device 100 may provide information on a type of at least one identified wine among the information of the plurality of wines, at operation S730.

Figure 8:
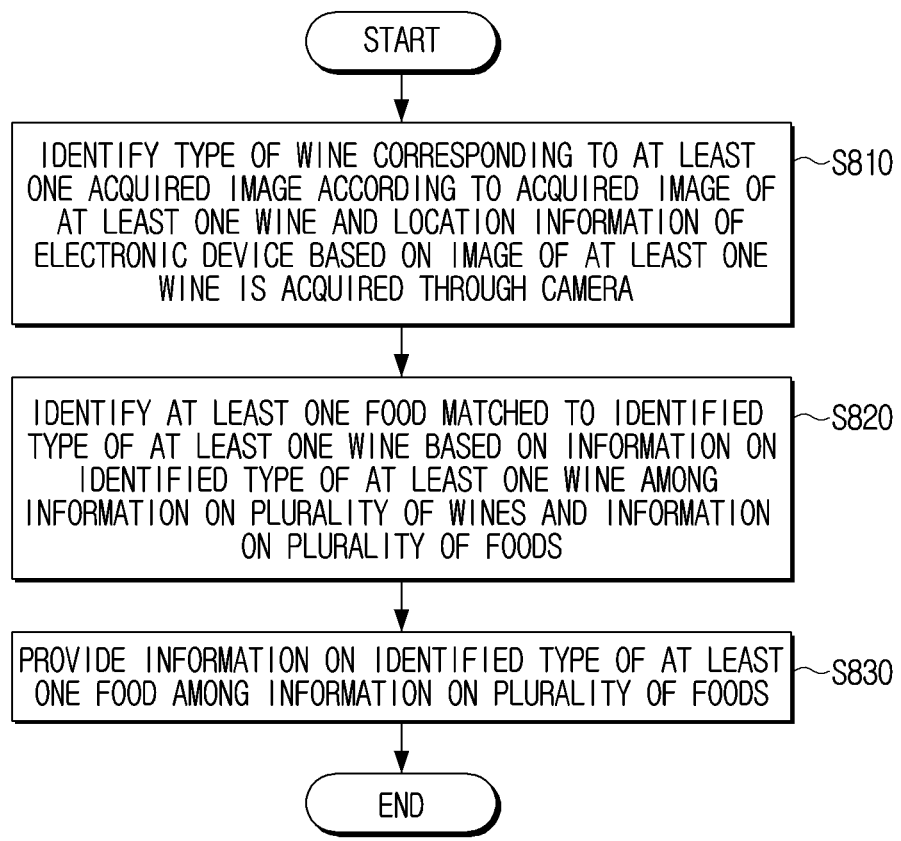
FIG. 8 is a diagram for explaining a control method of an electronic device according to an embodiment.

FIG. 8 is a flowchart for explaining a control method of the electronic device 100 according to an embodiment of the disclosure. First, based on an image of at least one wine being acquired through a camera, the electronic device 100 may identify a type of wine corresponding to the acquired image based on the acquired image of at least one wine and location information of the electronic device, at operation S810. Specifically, the electronic device 100 may acquire feature data of the acquired image, and acquire a plurality of wine type candidates corresponding to the image and a probability corresponding to each candidate by using the acquired feature data. In addition, the electronic device 100 may apply a weight to a type of wine searched or sold at the location of the electronic device among the plurality of wine type candidates based on the information on the wine searched or sold at the location of the electronic device. Therefore the electronic device 100 may identify the wine corresponding to the highest probability based on the weight being applied as the wine corresponding to the image.

In addition, the electronic device 100 may identify at least one food matched to the identified type of at least one wine based on information on the identified type of at least one among the information on the plurality of wines and the information on the plurality of foods, at operation S820. Specifically, the electronic device 100 may acquire a matching probability for each of the plurality of foods by performing an operation between the weights corresponding to the plurality of categories included in the information on the identified type of wine and the weights corresponding to the plurality of categories included in the information on the plurality of foods. In addition, the electronic device 100 may identify a type of food having the highest matching probability or types of a plurality of foods having a high matching probability up to a preset rank as the type of food matched to the identified type of wine.

In addition, the electronic device 100 may provide information on the identified type of at least one food among the information on the plurality of foods at operation S830.

Meanwhile, it is to be understood that the drawings attached to the disclosure are not intended to limit the technology described in the disclosure to a specific embodiment, and include various modifications, equivalents, and/or alternatives of the embodiments of the disclosure. In connection with the description of the drawings, similar reference numerals may be used for similar components.

In the disclosure, an expression "have", "may have", "include", "may include", or the like, indicates an existence of a corresponding feature (for example, a numerical value, a function, an operation, a component such as a part, or the like), and does not exclude an existence of an additional feature.

In the disclosure, an expression "A or B", "at least one of A and/or B", "one or more of A and/or B", or the like, may include all possible combinations of items listed together. For example, "A or B", "at least one of A and B", or "at least one of A or B" may refer to all cases (1) including at least one A, (2) including at least one B, or (3) including both at least one A and at least one B.

Expressions "first", "second", and the like, used in the disclosure may indicate various components regardless of a sequence and/or importance of the components, will be used only in order to distinguish one component from the other components, and do not limit the corresponding components.

Based on it being mentioned that any component (e.g., a first component) is (operatively or communicatively) coupled with/to or is connected to another component (e.g., a second component), it is to be understood that any component is directly coupled with/to another component or may be coupled with/to another component through the other component (e.g., a third component). On the other hand, based on it being mentioned that any component (e.g., a first component) is "directly coupled with/to" or "directly connected to" to another component (e.g., a second component), it is to be understood that the other component (e.g., a third component) is not present between any component and another component.

An expression "configured (or set) to" used in the disclosure may be replaced by an expression "suitable for", "having the capacity to", "designed to", "adapted to", "made to", or "capable of" depending on a situation. A term "configured (or set) to" may not necessarily mean only "specifically designed to" in hardware. Instead, in any context, an expression "a device configured to" may mean that the device is "capable of" together with other devices or components. For example, a "sub-processor configured (or set) to perform A, B, and C" may mean a dedicated processor (e.g., an embedded processor) for performing the corresponding operations or a generic-purpose processor (for example, a central processing unit (CPU) or an application processor) that may perform the corresponding operations by executing one or more software programs stored in a memory device.

The electronic device 100 and the external device according to diverse embodiments of the disclosure may include at least one of, for example, a smartphone, a tablet personal computer (PC), a desktop PC, a laptop PC, a netbook computer, a server, a personal digital assistant (PDA), a medical device, or a wearable device. In some embodiments, the electronic device may include at least one of, for example, a television, a refrigerator, an air conditioner, an air purifier, a set-top box, or a media box (e.g., Samsung Home Sync™, Apple TV™, or Google TV™).

The diverse embodiments of the disclosure may be implemented by software including instructions that are stored in machine (e.g., a computer)-readable storage media. The machine is a device that invokes the stored instructions from the storage medium and is operable according to the called instruction, and may include the electronic device (e.g., the electronic device 100) according to the disclosed embodiments. Based on the instructions being executed by the processor, the processor may perform functions corresponding to the instructions, either directly or using other components under the control of the processor. The instructions may include codes generated or executed by a compiler or an interpreter. The machine-readable storage medium may be provided in the form of non-transitory storage medium. Here, the term 'non-transitory storage medium' may indicate that it does not contain a signal and is tangible, but does not distinguish between semi-permanent or temporary storage of data in the storage medium. For example, the 'non-transitory storage medium' may include a buffer in which the data is temporarily stored.

According to an embodiment, the method according to the diverse embodiments disclosed in the disclosure may be included in a computer program product and provided. The computer program product may be traded as a product between a seller and a purchaser. The computer program product may be distributed in the form of a storage medium (for example, a compact disc read only memory (CD-ROM)) that may be read by a device, or online through an application store (for example, PlayStore™). In the case of the online distribution, at least a portion of the computer program product (e.g., a downloadable app) may be at least temporarily stored in a storage medium such as a memory of a server of a manufacturer, a server of an application store, or a relay server, or may be temporarily generated.

Embodiments may be described and illustrated in terms of blocks which carry out a described function or functions. These blocks, which may be referred to herein as units or modules or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Each of the components (e.g., modules or programs) according to the diverse embodiments may include a single entity or a plurality of entities, and some sub-components of the sub-components described above may be omitted, or other sub-components may be further included in the diverse embodiments. Alternatively or additionally, some components (e.g., modules or programs) may be integrated into one entity to perform the same or similar functions performed by the respective components prior to the integration. The operations performed by the module, the program, or other component according to the diverse embodiments may be performed in a sequential, parallel, iterative, or heuristic manner, or at least some operations may be executed in a different order or omitted, or other operations may be added.

| [Detailed Description of Main Elements] | |
|---|---|
| 110: memory | 120: communicator |
| 130: sensor | 140: processor |
| 150: display | 160: inputter |
| 170: speaker | 180: camera |

The invention claimed is:

1. A control method of an electronic device including a camera, the control method comprising:
 based on an image of food being acquired through the camera, identifying a type of the food based on the acquired image and location information of the electronic device;
 identifying a type of at least one wine matched to the identified type of the food based on information about the identified type of the food from among information about a plurality of foods and information about a plurality of wines; and
 providing information about the identified type of the at least one wine,
 wherein the identifying the type of the at least one wine comprising:

acquiring a matching probability of each of the plurality of wines by performing an operation between weights corresponding to a plurality of categories included in the information about the identified type of the food and weights corresponding to a plurality of categories included in the information about the plurality of wines, and identifying the at least one wine among the plurality of wines according to the matching probability.

2. The control method as claimed in claim 1, further comprising:

acquiring the location information of the electronic device using a sensor of the electronic device while the image of the food is acquired through the camera;

transmitting the acquired location information to an external server; and receiving information about searched food that was previously searched at a location identified based on the location information from the external server.

3. The control method as claimed in claim 2, further comprising:

acquiring a plurality of food type candidates and probabilities corresponding to the plurality of food type candidates by inputting the acquired image of the food into a first model; and applying a weight to a food type candidate that was previously searched at the location among the plurality of food type candidates based on the information about the searched food.

4. The control method as claimed in claim 1, wherein a plurality of categories included in the information about the plurality of foods includes at least one of food ingredients, cooking methods, spices, or sauces for the plurality of foods, and wherein a plurality of categories included in the information about the plurality of wines includes at least one of body, tannin, acidity, sugar content, or alcohol content for the plurality of wines.

5. The control method as claimed in claim 1, further comprising:

adjusting the weights corresponding to the plurality of categories included in the information about the identified type of the food and the weights corresponding to the plurality of categories included in the information about the plurality of wines based on pre-stored information related to a user of the electronic device.

6. The control method as claimed in claim 1, further comprising:

based on information about a type of new food being input from a user, generating weights corresponding to a plurality of categories included in the information about the type of the new food; and acquiring the matching probability of the each of the plurality of wines by performing an operation between the weights corresponding to the plurality of categories included in the information about the type of new food and the weights corresponding to the plurality of categories included in the information about the plurality of wines.

7. The control method as claimed in claim 1, further comprising:

acquiring the information about the type of the food by recognizing an image matched with the information about the type of the food;

transmitting the acquired information about the type of the food to an external server;

receiving information about the at least one wine matched to the information about the type of the food among wines included in a place corresponding to the external server from the external server; and providing the received information about the at least one wine.

8. The control method as claimed in claim 1, further comprising:

providing the acquired image of the food and information about the at least one wine together.

9. A control method of an electronic device including a camera, the control method comprising:

based on an image of at least one wine being acquired through the camera, identifying a type of the at least one wine based on the acquired image and location information of the electronic device;

identifying at least one food matched to the identified type of the at least one wine based on information about the identified type of the at least one wine among information about a plurality of wines and information about a plurality of foods; and providing information about the at least one food among the information about the plurality of foods.

10. The control method as claimed in claim 9, further comprising:

acquiring the location information of the electronic device using a sensor of the electronic device while the image of the at least one wine is acquired through the camera;

transmitting the acquired location information to an external server; and receiving information about searched wine that was previously searched or sold at a location identified based on the location information from the external server.

11. The control method as claimed in claim 10, further comprising:

acquiring a plurality of wine type candidates and probabilities corresponding to the plurality of wine type candidates by inputting the acquired image of the at least one wine into a second model; and applying a weight to a wine type candidate that was previously searched or sold at the location among the plurality of wine type candidates based on the information about the searched wine.

12. The control method as claimed in claim 9, further comprising:

acquiring a matching probability of each of the plurality of foods by performing an operation between weights corresponding to a plurality of categories included in the information about the identified type of the at least one wine and weights corresponding to a plurality of categories included in the information about the plurality of foods; and identifying the at least one food among the plurality of foods according to the matching probability.

13. The control method as claimed in claim 12, further comprising:

adjusting the weights corresponding to the plurality of categories included in the information about the identified type of the at least one wine and the weights corresponding to the plurality of categories included in the information about the plurality of foods based on pre-stored information related to a user of the electronic device.

14. The control method as claimed in claim 13, wherein the plurality of categories included in the information about the plurality of foods includes at least one of food ingredients, cooking methods, spices, or sauces for the plurality of foods, and wherein the plurality of categories included in the information about the plurality of wines includes at least one of body, tannin, acidity, sugar content, or alcohol content for the plurality of wines.

\* \* \* \* \*